April 22, 1952     J. BECHIK     2,593,524
ADJUSTABLE FISHLINE DOBBER
Filed March 17, 1947
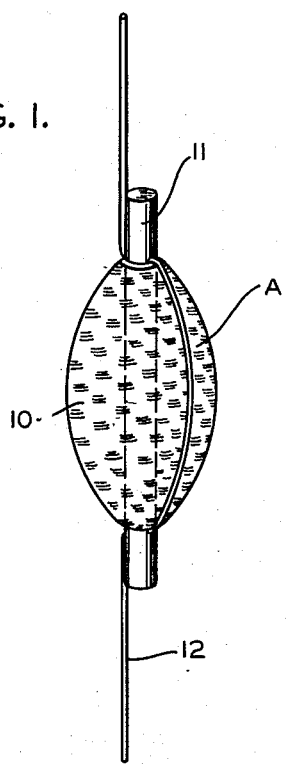
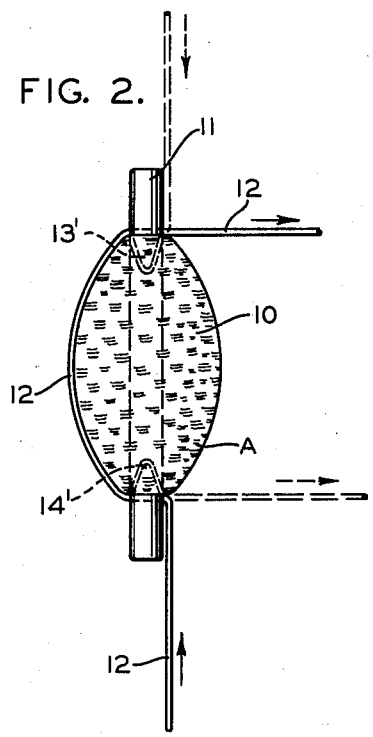
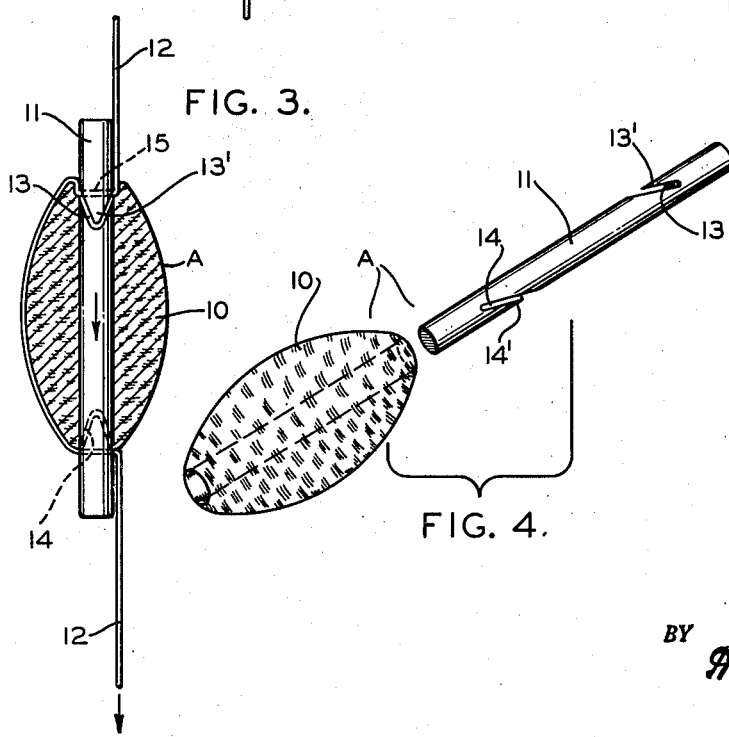
INVENTOR.
JOSEPH BECHIK

Patented Apr. 22, 1952

2,593,524

UNITED STATES PATENT OFFICE 2,593,524

ADJUSTABLE FISHLINE DOBBER

Joseph Bechik, St. Paul, Minn.

Application March 17, 1947, Serial No. 735,103

4 Claims. (Cl. 43—44.93)

My invention relates to an adjustable fish line dobber which permits the fisherman to adjust the dobber to a predetermined position on the line in a very simple manner, wherein, when the dobber is adjusted, a straight longitudinal pull on the fish line causes the dobber to be automatically locked in the adjusted position.

A feature of my dobber resides in its simplicity. It is composed of two parts, one of which is the float or cork and the other a rod extending through the core of the cork. The rod, which extends through the core, fits fairly free to slide longitudinally in the cork. This rod is formed with two diagonally positioned slots, one at either end of the rod and preferably extending in from the outer surface of the rod in opposite directions to each other. The slots are spaced from the ends of the rod and from each other in proportion to the longitudinal length of the cork or float member.

It is also a feature to provide the rod with diagonal slots oppositely disposed to each other and spaced apart to a degree so that when the rod extends through the float or cork, the open ends of the slots will be positioned within the float; thus the fish line, which is hooked into the slots, cannot become disengaged from the slots of the rod until the rod is slid in either direction far enough to fully expose the open end of either of the slots. Consequently the fish line, once it is attached to the rod with a portion extending over the outside of the float, will not accidentally become disengaged from the float. Nevertheless, the line can be disengaged by the fisherman whenever he desires by pushing either one end or the other longitudinally into the float so as to fully expose the slot at the other end of the rod and permit the fish line to be disengaged therefrom.

A primary feature of my adjustable fish line dobber resides in the simple manner in which the fish line may be adjusted by simply pulling on either end of the fish line projecting from the dobber in a horizontal or transverse direction to the dobber and rod. This permits the line to be slid over the dobber into the desired position whereupon, when a longitudinal pull is exerted on the fish line from either end, the rod will be caused to slide in the direction of the pulling force and the fish line in the slot on the end opposite to the pull will be drawn into the float or cork, the fish line then causing a wedge between the rod and the cork which locks the dobber in place.

In this manner I provide an extremely simple dobber which may be adjusted at any time on the fish line and wherein there are only the two parts, namely: the cork or float, and the rod which extends through the same.

These features and details of my invention will be more fully and clearly hereinafter set forth.

In the drawings forming a part of this specification:

Figure 1 is a perspective of my dobber as it will appear in use.

Figure 2 is a side elevation of my dobber showing the manner in which a horizontal pull can be exerted on the fish line to adjust the dobber on the line.

Figure 3 is a section detail of one end of the dobber, showing the line locking the dobber in place with a longitudinal pull on the line in the direction of the arrows.

Figure 4 is a perspective detail showing the cork or float and the core rod removed therefrom.

My dobber A is formed of two parts, namely: the cork 10 and the core rod 11. The core rod 11 slides through the axis of the float 10 just free enough to permit the rod to move readily in a longitudinal direction when a pull is exerted on the fish line 12, as will be more fully hereinafter described.

The rod 11 is formed with two diagonal slots 13 and 14 which are cut or formed inwardly from the outer surface of the rod 11. The slot 13 is formed on the side of rod 11 opposite to the slot 14.

In forming the slots 13 and 14, tongue-like ends 13' and 14' are formed.

The slots 13 and 14 are spaced apart in a manner to cause the respective tongues 13' and 14' to be positioned normally within the cork or float 10 as illustrated in Figure 2. Thus, when a horizontal pull on the line 12 in the direction of the arrows is exerted as shown in Figure 2, the rod 11 will assume a neutral position which permits the fish line 12 to slide through the slot 14 and through the slot 13 so that the dobber A may be adjusted on the line 12. When the fisherman has adjusted the dobber A in the desired position on the line 12, the line will extend longitudinally of the dobber as illustrated in Figures 1 and 3. It will then be apparent that a longitudinal pull on the fish line 12 as illustrated by the arrows in Figure 3 will cause the core rod 11 to be moved in the direction of the arrows, forming a loop 15 of the line 12 in the base of the slot 13 and wedging the line in the axial opening of the float 10. This rigidly locks the dobber A in an adjusted position on the line 12.

It will be observed that if the line 12 is pulled in an opposite direction to the force shown by the arrows in Figure 3, the rod 11 will be pulled in the direction of the force of the pull and in turn cause the fish line 12 to form in a wedging loop in the slot 14. Therefore, any longitudinal pull on either end of the line 12 will instantly lock the dobber by the wedging of the fish line into the ends of the cork or float 10.

It will be obvious also that a horizontal or transverse pull as indicated in Figure 2 on either end of the line 12 will immediately draw the core rod 11 into neutral position and permit the free adjustment of the dobber A on the line. When the core rod is moved into neutral position as illustrated in Figure 2, the fish line runs freely around the cork and through the respective slots 13 and 14 so long as the rod 11 is in neutral position.

To disengage the line from the slots of the rod 11, it is only necessary to push one end of the rod into the float far enough to fully expose either the slot 13 or 14, whereupon the fish line may be disengaged from the exposed slot.

It is understood that when a longitudinal pull on the line 12 is exerted, the line will be extending in a longitudinal position to the dobber, as illustrated in the drawings, wherein a longitudinal pull on the line 12 from either end of the dobber will cause a locking operation as illustrated in Figure 3.

The simplicity of my dobber is apparent. There are no parts to get out of order, it can be made economically, and its functions are positive to lock the line to the dobber in any desired position. Further, the assembly of the dobber to the fish line is equally simple as the construction thereof.

I claim:

1. An adjustable fish line dobber including two parts, one of said parts comprising a float and the other of said parts comprising a core rod adapted to extend freely through said float, said core rod having a pair of slots which are parallelly and oppositely disposed and positioned diagonally to the longitudinal axis of the core rod, said slots being spaced apart in a manner to have their open ends closed by being positioned within said float when said rod is in a neutral position to permit a fish line to be adjusted and to automatically lock the fish line by a longitudinal pull thereon, which moves said rod into a locking position.

2. An adjustable fish line dobber including a rod member having parallelly formed slots spaced apart and positioned diagonally to the longitudinal axis of said rod member, a float having a hole formed longitudinally thereof adapted to receive said rod member and positioned over said slots, and a fish line placed around a part of said float and extending through said slots, whereby when said fish line is pulled away from said float and parallel with said rod member, said float is adjustably locked on said fish line.

3. A fish line dobber comprising a float, said float having an axial hole, a core rod having parallelly and oppositely disposed slots positioned diagonally to the longitudinal axis of said core rod and adapted to extend freely through said hole, said slots being spaced apart in a manner to have their open ends closed by said float when said core rod is in a neutral position therein, and a fish line slidably extending through said slots when said core rod is in neutral position and adapted to be automatically locked to said dobber by a longitudinal pull on said fish line.

4. An adjustable dobber for fish lines including a float having an axial opening through said float, and a core rod slidably positioned in said float having a pair of slots formed therein, said slots being parallelly and oppositely disposed, and positioned diagonally to the longitudinal axis of said core rod, with the distance therebetween less than the length of said float.

JOSEPH BECHIK.

REFERENCES CITED

The following references are of record in the file of this patent:

UNITED STATES PATENTS

| Number | Name | Date |
|---|---|---|
| 261,505 | Wilson | July 18, 1882 |
| 575,674 | Woodward | Jan. 19, 1897 |
| 729,687 | Smith | June 2, 1903 |
| 1,278,312 | Davis | Sept. 10, 1918 |
| 1,418,944 | Lower | June 6, 1922 |
| 2,162,659 | Wilson | June 13, 1939 |
| 2,163,483 | Carlisle | June 20, 1939 |